(12) United States Patent
Hoppe et al.

(10) Patent No.: US 6,509,396 B1
(45) Date of Patent: Jan. 21, 2003

(54) COATING AGENT EMULSION AND ITS USE IN LACQUERS

(75) Inventors: Lutz Hoppe, Walsrode (DE); Hans-Günter Poersch-Panke, Bomlitz (DE); Klaus Nachtkamp, Walsrode (DE)

(73) Assignee: Wolff Walsrode AG, Walsrode (DE)

( * ) Notice: Subject to any disclaimer, the term of this patent is extended or adjusted under 35 U.S.C. 154(b) by 0 days.

(21) Appl. No.: 09/626,323

(22) Filed: Jul. 26, 2000

(30) Foreign Application Priority Data

Aug. 4, 1999 (DE) .......................... 199 36 634

(51) Int. Cl.⁷ ............... C08J 5/10; C08L 1/00
(52) U.S. Cl. .............. 524/35; 524/475; 524/476
(58) Field of Search ............. 524/35, 475, 476, 524/477

(56) References Cited

U.S. PATENT DOCUMENTS

| | | | |
|---|---|---|---|
| 4,066,818 A | 1/1978 | Junge et al. | 428/341 |
| 4,306,988 A | 12/1981 | Wenzel et al. | 260/13 |
| 4,321,169 A | 3/1982 | Miller | 524/428 |
| 4,517,324 A | 5/1985 | Luhmann et al. | 524/27 |
| 5,384,163 A | 1/1995 | Budde et al. | 427/385.5 |
| 5,387,642 A | 2/1995 | Blum et al. | 524/591 |
| 6,218,448 B1 | 4/2001 | Kraaijevanger et al. | 524/31 |

FOREIGN PATENT DOCUMENTS

| | | |
|---|---|---|
| CA | 1331667 | 8/1994 |
| DE | 4226243 | 2/1994 |
| FR | 1 366 532 | 1/1973 |
| WO | 00/73388 | 12/2000 |

*Primary Examiner*—James J. Seidleck
*Assistant Examiner*—U. K Rajguru
(74) *Attorney, Agent, or Firm*—Joseph C. Gil; Aron Preis; James R. Franks

(57) ABSTRACT

An oil-in-water coating agent is described. The coating agent emulsion is prepared from a composition comprising: a) 5.0 to 50 wt. % of cellulose substance; b) 5.0 to 50 wt. % of at least one hydroxyl group-containing lacquer resin; c) 2.0 to 25 wt. % of at least one polyisocyanate having more than one free isocyanate group; d) 10.0 to 65 wt. % of water; e) 0.5 to 30 wt. % of plasticiser; f) 0.0 to 20 wt. % of emulsifier; and g) 0.0 to 45 wt. % of at least one organic solvent. The sum of components a) to g) of the composition is 100 wt. %, and the weight ratio of hydroxyl groups of the hydroxyl group-containing lacquer resin b) to NCO groups of the polyisocyanate c) is 1:0.05 to 1:5. Also described is a method of using the coating agent emulsion, and its application to the surface of materials, such as wood and metal.

5 Claims, No Drawings

COATING AGENT EMULSION AND ITS USE IN LACQUERS

CROSS REFERENCE TO RELATED PATENT APPLICATION

The present patent application claims priority under 35 U.S.C. §119 (a)–(d) of German Patent Application No. 199 36 634.9, filed Aug. 4, 1999.

DESCRIPTION OF THE INVENTION

Nitrocellulose/alkyd resin combinations, dissolved in organic solvents (known by the name "NC combi-lacquers") have been known for a long time for lacquering various surfaces such as e.g. wood, metal, paper, leather, etc. The solvent content is in the range 60 to 80 %.

EP 0 076 443 describes the preparation, inter alia, of aqueous nitrocellulose/lacquer resin emulsions which can be used for surface lacquering. These surfaces, however, have inadequate resistances in accordance with DIN 68 861, part 1, 1 B.

Chemically cross-linking aqueous two-component polyurethane coating agents with free polyisocyanates as hardeners for the binder were described in EP 0 358 979. According to that document, polyhydroxyacrylates as binder components are capable of emulsifying certain polyisocyanates with free isocyanate groups, these also being called lacquer polyisocyanates. The aqueous two-component system produced in this way cures to give cross-linked films. The lacquer polyisocyanates are biuret, urethane, uretdione and/or isocyanate group-containing oligomeric derivatives of readily available monomeric or simple diisocyanates, in particular of hexamethylene diisocyanate (HDI). The lacquer polyisocyanates used in accordance with EP 0 358 979 have a viscosity at 23° C. of up to 1000 mPa·s and have an average NCO functionality of 2.2 to 5.

DE-OS-A 4 226 243 describes an aqueous two-component coating agent based on polyisocyanates and self-emulsifying fatty acid modified polyesters and polyurethanes. European patent application EP-A 0 496 205 also describes aqueous binder combinations based on polyisocyanates and self-emulsifying urethane, carboxyl and hydroxyl group-containing polyester resins. German patent DE 3 122 030 describes coating compositions consisting of polyisocyanate and water-dilutable alkyd, melamine and acrylic resins which also contain water-miscible solvent.

The disadvantage of these water-dilutable two-component binders described above is the low solids content which can be achieved, the relatively low boiling limits and the short pot life.

The disadvantages of two-component coating agents based on hydroxyl group-containing polyester resins (alkyd resins or acrylates) are the generally recognised short pot lives and long drying times. The incorporation of nitrocelluloses with a nitrogen content of 10.7 to 12.6 % improves wetting onto wood, shortens the drying time, increases the hardness and improves the sandability.

SUMMARY OF THE INVENTION

Now, the object of the invention comprises eliminating the disadvantages of aqueous NC/lacquer resin emulsions and the preparation and use of improved NC/lacquer resin emulsions This was achieved by the addition of polyisocyanates which can be emulsfied in weater.

The invention provides aqueous emulsions of the oil-in-water type which contain, as binder, at least one cellulose substance and hydroxyl group-containing lacquer resin and also a water-emulsifiable polyisocyanate, prepared up from:
  a) 5.0–50 wt. % of cellulose substance
  b) 5.0–50 wt. % of one or more hydroxyl group-containing lacquer resins
  c) 2.0–25 wt. % of one or more polyisocyanates with more than one free iso-cyanate group
  d) 10.0–65 wt. % of water
  e) 0.5–30 wt. % of plasticiser
  f) 0.0–20 wt. % of emulsifier
  g) 0.0–45 wt. % of at least one organic solvent wherein the sum of a) to g) is 100 wt. %, characterised in that the ratio by weight of cellulose substance to OH group-containing lacquer resin is 1:5 to 5:1 and the ratio by equivalents of OH groups (from the lacquer resin) to NCO groups is 1:0.05 to 1:5.

DETAILED DESCRIPTION OF THE INVENTION

Suitable cellulose substances are preferably cellulose esters, in particular nitrocelluloses of any level of viscosity or plasticised nitrocelluloses or mixtures of these. Nitrocellulose, for example in conventional industrial nitrocellulose grades, i.e. cellulose nitrates with a nitrogen content of 10.7 to 12.6 wt. %, is very particularly suitable.

Other cellulose substances which can be used are cellulose acetobutyrate and cellulose acetopropionate of any level of viscosity and substitution. Conventional lacquer resins may be used as lacquer resins if these contain isocyanate-reactive groups such as e.g. —OH, —COOH, —NH$_2$, —CONH$_2$. Conventional lacquer resins are e.g. alkyd, maleic acid, phenol, formaldehyde, xylene- formaldehyde, ketone, sulfonamide, aldehyde, amine, epoxy, carbamate, coumarone/indene resins, esters of saccharose and vinyl or acrylate resins and copolymers of these.

It is advantageous if the hydroxyl group-containing lacquer resins have an OH value between 20 and 200 mg KOH/g.

Plasticisers which may be used are conventional plasticisers such as e.g. the esters of aliphatic monocarboxylic acids, preferably with 2 to 18 carbon atoms such as cetyl acetate, glycol diacetate, stearates, ricinoleic acetate, dicarboxylic acids such as e.g. dioctyl adipate, dimethylcycohexylmethyl adipate, dibutyl sebacate; aromatic di-carboxylic acids such as e.g. dibutyl phthalate, dioctyl phthalate, dicyclohexyl phthalate, aliphatic tricarboxylic acids, preferably with 8 carbon atoms, of aromatic dicarboxylic acids and of monohydric alcohols with 2 to 10 carbon atoms, of dihydric alcohols with 2 to 6 carbon atoms and trihydric alcohols with 3 carbon atoms or the esters of inorganic acids such as e.g. tributyl phosphate, triphenyl phosphate; esters of citric acid with alcohols with 1 to 5 carbon atoms which may also be reacted with monocarboxylic acids with 1 to 4 carbon atoms; and also sulfonamides, oils such as castor oil and linseed oil and the alkoxylation products of the compounds mentioned such as e.g. ethoxylated castor oil and soya oil, stearates and phosphates.

The emulsifiers used are optionally anionic emulsifiers, for example long-chain alkylaryl sulfonates such as dodecylbenzene sulfonate or butylnaphthaline sulfonate, alkyl sulfates such as lauryl or stearyl alcohol sulfates, sulfosuccinates such as dioctyl disodium succinate, or non-ionic emulsifiers such as octyl- or nonylphenoloxyethylates.

The disodium salts of sulfosuccinic acid derivatives of ethoxylated nonylphenols may also be mentioned as anionic emulsifiers.

Conventional organic solvents may be used as solvents provided the cellulose substance and the lacquer resin are soluble therein.

The polyisocyanates are any organic polyisocyanates with aliphatically, cycloaliphatically, araliphatically and/or aromatically bonded, free isocyanate groups which are liquid at room temperature. Particularly preferably, the polyisocyanates are polyisocyanates or polyisocyanate mixtures with exclusively aliphatically and/or cycloaliphatically bonded isocyanate groups with an (average) NCO functionality of between 1.8 and 5.0.

If required, the polyisocyanates may be used mixed with small amounts of inert solvents in order to lower the viscosity.

Suitable products are, for example, "lacquer polyisocyanates" based on hexa-methylene diisocyanate or on 1-isocyanato-3,3,5-trimethyl-5-isocyanatomethyl- cyclohexane (IPDI) and/or bis-(isocyanatocyclohexyl)-methane, in particular those which are based exclusively on hexamethylene diisocyanate. "Lacquer polyisocyanates" based on these diisocyanates are understood to be the biuret, urethane, uretdione and/or isocyanate group-containing derivatives known per se of these diisocyanates.

Also suitable according to the invention, but less preferred, aromatic polyisocyanates are in particular "lacquer polyisocyanates" based on 2,4-diisocyanatotoluene or technical grade mixtures of this with 2,6-diisocyanatotoluene or based on 4,4-diisocyantodiphenylmethane or mixtures of this with its isomers and/or higher homologues. These types of aromatic lacquer polyisocyanates are, for example, urethane group-containing isocyanates such as are obtained by reacting excess amounts of 2,4-diisocyanatotoluene with polyhydric alcohols such as trimethylol-propane. Further aromatic lacquer polyisocyanates are, for example, trimers of the monomeric diisocyanates mentioned by way of example, i.e. the corresponding isocyanato-isocyanurates.

Basically, the use of unmnodified polyisocyanates of the type mentioned by way of example is obviously also possible.

Hydrophilised polyisocyanates of the basic products mentioned above, which can readily be emulsified in water, are extremely suitable.

The coating agent emulsions are obtained by adding the polyisocyanate, with stirring, to the emulsion of cellulose substance, OH group-containing lacquer resin, plasticisers and optionally one or more solvents. Better emulsification of the polyisocyanate is achieved when the polyisocyanate is dissolved in or diluted with a suitable solvent such as e.g. methoxypropyl acetate and then added to the lacquer emulsion.

The invention also provides use of the coating agent emulsions according to the invention in lacquers for the surface treatment of wood, metal, paper, leather or plastics.

Depending on the area of application (e.g. wood, metal, plastics, leather, glass and film lacquering), other known organic solvents may also be added to the emulsion, wherein a solvent concentration of 25%, with respect to the final lacquer formulation, should not be exceeded.

The viscosity may be adjusted for use in the desired application either with water or by adding water-soluble thickeners based e.g. on polyurethanes, cellulose, guar, starch and the like.

Furthermore, substances which improve the processing or application properties such as e.g. lubricants, gloss-improving agents, anti-foam agents, sandability-improving agents, flow control agents, stabilisers, light stabilisers and colorants, pigments, fillers and/or conventional lacquer additives may also be added to the emulsion, preferably to the aqueous phase.

Aqueous coating agent emulsions prepared according to the invention have very good flow characteristics, high gloss and a long pot life. Using a lacquer composition formulated in accordance with the application exceptional alcohol and water resistances, for example, can be achieved.

Examples

Aqueous NC/alkyd resin emulsions were prepared in accordance with EP-B 0 076 443, the formulations of which are given in the following table:

|  | Nitrocellulose[1] std. type E 24 [g] | Alkyd resin [g] | Emulsifiers [g] | Dibutylphthalate [g] | MPA* [g] | Water [g] | Ratio of NC: alkyd | Solids content [%] | Flow time (21° C.) DIN-4 beaker [s] |
|---|---|---|---|---|---|---|---|---|---|
| Emulsion 1 | 277.8 | 425.6[2] | 63.0 | 42.0 | 57.0 | 623.7 | 1:1.72 | 38 | 17.0 |
| Emulsion 2 | 121.9 | 283.7[2] | 28.0 | 18.7 | 25.3 | 359.5 | 1:2.6 | 38 | 16.0 |
| Emulsion 3 | 91.5 | 283.7[2] | 21.0 | 14.0 | 19.0 | 331.0 | 1:3.4 | 38 | 14.0 |
| Emulsion 4 | 121.9 | 329.6[3] | 28.0 | 18.7 | 15.3 | 329.5 | 1:2.6 | 38 | 20.0 |

[1] Used as water-moist nitrocellulose: 65% nitrocellulose with 35% water. $N_2$ content: 12.1 wt. %.
[2] A hydroxyl group-containing alkyd resin prepared in accordance with example 1 in NL application 1 008 777 was used as a 70 wt. % strength alkyd resin in butyl acetate (OH value = 145 mg KOH/g).
[3] The hydroxyl group-containing alkyd resin "Halwftal B 32", from Huttenes-Alberts Lackrohstoff GmbH, was used as a 60 wt. % strength alkyd resin dissolved in butyl acetate (OH content: 2.4%).
*) MPA = methoxypropyl acetate The polyisocyanate component may generally consist of any mixture at all of the polyisocyanates mentioned by way of example.

Water-emulsifiable polyisocyanates in the form of a 70 wt. % strength polyisocyanate solution in methoxypropyl acetate were stirred into the aqueous NC/alkyd resin emulsions.

|   | Emulsion 1 [g] | Emulsion 2 [g] | Emulsion 3 [g] | Emulsion 4 [g] | Polyisocyanate (70% strength) [g] | Ratio of (OH)alkyd:NCO | Pot life |
|---|---|---|---|---|---|---|---|
| Ex. 1 | 200 | — | — | — | 34.9 of 2) | 1:0.77 | 24 h |
| Ex. 2 | — | 200 | — | — | 60.6 of 1) | 1:1 | 24 h |
| Ex. 3 | — | — | 200 | — | 62.2 of 1) | 1:1 | >10 days |
| Ex. 4 | — | — | — | 200 | 15.2 of 1) | 1:0.5 | >10 days |

1) The hydrophilic aliphatic polyisocyanate based on hexamethylene diisocyanate with a NCO content of 16.0 % and a viscosity at 23° C. of 3,700 mPa·s (commercial product Bayhydur 3100 from Bayere® AG) was used.

2) The commercial product Basonat P LR 8878 from BASF AG was used. NCO content: 17.2%; viscosity at 23° C. =4,473 mPa·s The following were added to 100 g of the emulsions before adding the isocyanate:

| | |
|---|---|
| Emulsion 1 (without subsequent isocyanate addition) | 6.0 g butyl glycol acetate |
| Example 1 | 6.0 g butyl glycol acetate |
| Example 2 | 4.0 g butyl glycol acetate |
| Example 3 | 12.0 g butyl glycol acetate |
| Example 4 | 8.0 g butyl glycol acetate |

The emulsions were applied as primer and topcoat lacquer to wood using a 120 μm doctor blade. The primer was dried at 50° C., sanded and topcoat lacquered. In accordance with DIN 68 861, part 1, 1 B, the final coating was dried for 7 days at 50° C., then stored for 24 h at room temperature and then the resistances to water, ethanol and acetone were determined.

For comparison, emulsion 1 (without isocyanate cross-linking) was tested in the same way. The results are summarised in the following table.

|   | Water | Ethanol | Acetone |
|---|---|---|---|
| Emulsion 1 (without isocyanate addition) | 2 | 4 | 5 |
| Example 1 | 0 | 0 | 0 |
| Example 2 | 0 | 0 | 0 |

-continued

|   | Water | Ethanol | Acetone |
|---|---|---|---|
| Example 3 | 0 | 0 | 0 |
| Example 4 | 0 | 0 | 0 |

What is claimed is:

1. An oil-in-water coating agent emulsion prepared from a composition consisting essentially of:
   a) 5.0 to 50 wt. % of cellulose substance;
   b) 5.0 to 50 wt. % of at least one hydroxyl group-containing lacquer resin;
   c) 2.0 to 25 wt. % of at least one polyisocyanate having more than one free isocyanate group;
   d) 10.0 to 65 wt. % of water;
   e) 0.5 to 30 wt. % of plasticiser;
   f) 0.0 to 20 wt. % of emulsifier; and
   g) 0.0 to 45 wt. % of at least one organic solvent
   wherein the sum of components a) to g) is 100 wt. %, and the weight ratio of hydroxyl groups of said hydroxyl group-containing lacquer resin b) to NCO groups of said polyisocyanate c) is 1:0.05 to 1:5.

2. The coating agent emulsion of claim 1 wherein the ratio by weight of said cellulose substance a) to said hydroxyl group-containing lacquer resin b) is 1:5 to 5:1.

3. The coating agent emulsion of claim 1 wherein said cellulose substance a) is nitrocellulose.

4. A method of using the coating agent emulsion of claim 1 comprising:
   (i) incorporating said coating agent emulsion into a lacquer resin emulsion; and
   (ii) applying the resulting emulsion of (i) onto the surface of a material selected from the group consisting of wood, metal, paper, plastics, leather and glass.

5. The coating agent emulsion of claim 1 wherein said polyisocyanate c) has an average isocyanate functionality of between 1.8 and 5.0.

* * * * *